June 2, 1936.  G. A. LAMBRECHT  2,043,001
FISH BAIT OR LURE
Filed July 6, 1935
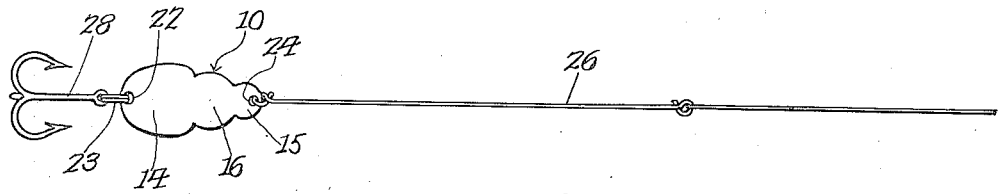
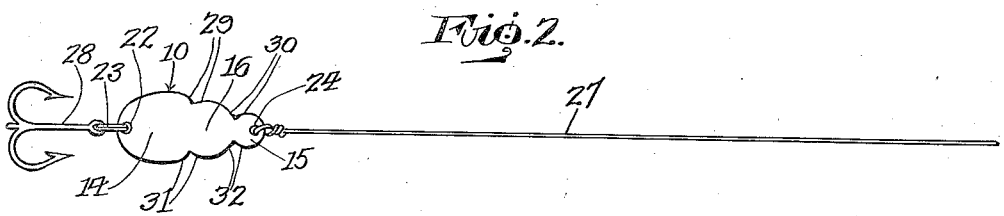
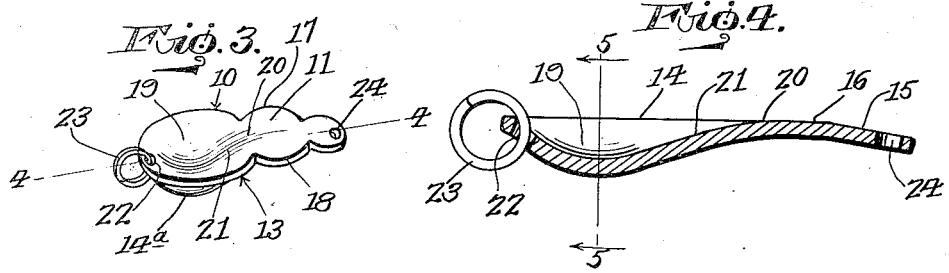
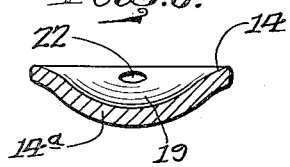
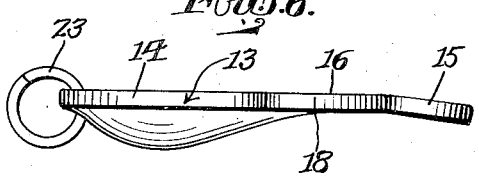
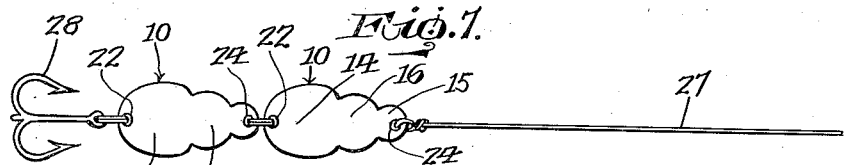
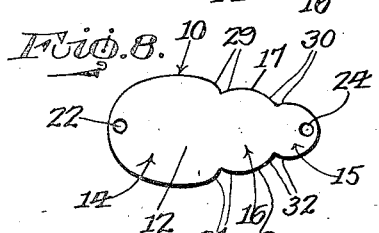
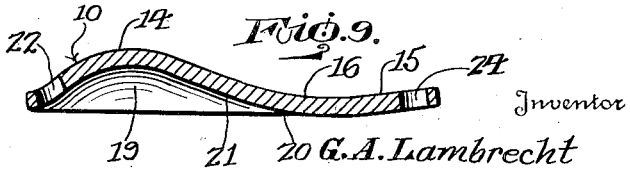
Inventor
G. A. Lambrecht
By Geo. P. Kimmel
Attorney Patented June 2, 1936

2,043,001

UNITED STATES PATENT OFFICE 2,043,001

FISH BAIT OR LURE

Gustav A. Lambrecht, Marinette, Wis.

Application July 6, 1935, Serial No. 30,141

10 Claims. (Cl. 43—42)

This invention relates to an artificial fish bait or lure and has for its object to provide, in a manner as hereinafter set forth, a lure of a construction and arrangement to effect a wobbling or wiggly balancing action from side to side and a rotating action when dragging or reeling in the line, to which the lure is attached respectively at moderate and high speeds thereby enhancing the effectiveness of the lure in attracting fish to a hook.

Further objects of the invention are to provide, in a manner as hereinafter set forth, a fish lure which is simple in its construction and arrangement, strong, durable, compact, simulating the appearance of a bug, thoroughly efficient in the use intended therefor, of a form possessing the characteristic to attract a fish, conveniently installed with respect to a fishing line, a leader or hook, permitting of a plurality thereof to be conveniently disposed in tandemwise relation and inexpensive to manufacture.

With the foregoing objects in view and to others which may hereinafter appear, the invention consists of the novel construction, combination and arrangement of parts as will be more specifically described and as illustrated in the accompanying drawing wherein is shown an embodiment of the invention, but it is to be understood that changes, variations and modifications may be resorted to which fall within the scope of the invention as claimed.

In the drawing:

Figure 1 is a plan view of the lure as attached to a leader,

Figure 2 is a plan view of the lure as attached directly to a fishing line,

Figure 3 is a perspective view of the lure,

Figure 4 is a section on line 4—4, Figure 3, upon an enlarged scale,

Figure 5 is a section on line 5—5, Figure 4,

Figure 6 is an elevation looking towards one side of the lure and upon an enlarged scale, Figure 7 is a plan view showing a plurality of the lures arranged tandemwise with respect to a hook and a leader, Figure 8 is a plan view of the lure upon an enlarged scale, and Figure 9 is a longitudinal sectional view of the lure upon an enlarged scale and with the lure inverted with respect to the position of the lure shown in Figures 3, 4, 5 and 6.

The body 10 of the lure is to simulate the appearance of a large bug and it is constructed of any suitable durable material of the desired weight. The side faces 11, 12, as well as the edge 13, of body 10 are painted in any desirable manner to form a bowl. The body 10, at its longitudinal median is of compound curvature in lengthwise section (Figure 4).

The body 10 includes an outer end portion or part 14 of frusto-elliptical contour, an inner end portion or part 15 substantially of semi-elliptical contour and an intermediate portion or part 16 substantially of semi-oval contour having its oppositely curved side edges indicated at 17, 18. The portion 14 is of greater length and width than portion 16. The portion 16 is of greater length and width than portion 15 and increases in width from the latter to portion 14. The portions 16, 15 are inset with relation to the portions 15, 14 respectively. The portion 14 is of cup-shaped form and of concavo-convex contour in longitudinal and horizontal section at any point thereof to form a cavity 19 of gradually increasing depth opening at the side face 11 of body 10. The portion 14 merges at its forward end into the rear end of portion 16 and extends, as at 14ᵃ laterally in one direction with respect to portion 15 to form a bowl. The forward end of portion 16 merges into the rear end of portion 15. The portion 15 is disposed at a downwardly inclination from its point of mergence with portion 16. The cavity 19 in portion 14 is so formed that its point of greatest depth is rearward of the transverse median of portion 14. That part of portion 16 bordering the point of mergence of portion 16 with portion 14 slopes downwardly as at 20 to the wall of cavity 19 and is of concavo-convex contour in transverse section. The portion 16, other than the part 20 thereof, is substantially flat. The central part 21 of the forward wall forming portion of cavity 19 slopes downwardly to the point of greatest depth of cavity 19. The rear end of portion 14 is formed with an opening 22 for connecting a ring 23 thereto. The forward end of portion 15 is formed with an opening 24 for the passage of coupling means for connecting it to an adjacent lure or for the purpose of connecting it to a leader 26 or a fishing line 27. The ring 23 is employed for connecting a hook 28 to body 10 or the ring 23 of one lure is employed for connecting another lure thereto in tandemwise relation as shown in Figure 7. The openings 22, 24 are intersected by the longitudinal median of body 10.

One side edge 13 of body 10 is formed with a pair of inwardly extending oppositely disposed edge portions 29 merging into each other and a pair of inwardly extending oppositely disposed edge portions 30 merging into each other. The other side edge 13 of body 10 is formed with a pair of inwardly extending oppositely disposed edge portions 31 merging into each other and a pair of inwardly extending oppositely disposed edge portions 32 merging into each other. The several edge portions referred to are formed due to the width of part 16 with respect to parts 14 and 15.

The portion 15 of the bait or lure is that part which is commonly referred to by fishermen as the lead or head end thereof. It corresponds for instance, to the head of the bug simulated by this bait and would be the forward end of the bait in its travel through the water when drawn in by the fisherman after it has been previously cast or let down into the water.

What I claim is:

1. A fish-lure comprising a one-piece body formed with a frusto-elliptical shaped outer end part having a cavity of gradually increasing depth opening at one side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, and said openings being intersected by the longitudinal median of said body.

2. A fish-lure comprising a one-piece body formed with a frusto-elliptical shaped outer end part having a cavity of gradually increasing depth opening at one side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, said openings being intersected by the longitudinal median of said body, and said outer end part having a portion offset laterally to form a bowl.

3. A fish-lure comprising a one-piece body formed with a frusto-elliptical shaped outer end part having a cavity of gradually increasing depth opening at one side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, and said openings being intersected by the longitudinal median of said body, the point of greatest depth of said body being rearwardly of the transverse median of said outer end part.

4. A fish-lure comprising a one-piece body formed with a frusto-elliptical shaped outer end part having a cavity of gradually increasing depth opening at one side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, said openings being intersected by the longitudinal median of said body, and said outer end part having a portion offset laterally to form a bowl, the point of greatest depth of said body being rearwardly of the transverse median of said outer end part.

5. A fish-lure comprising a one-piece body formed with a frusto-elliptical shaped outer end part having a cavity of gradually increasing depth opening at the side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, and said openings being intersected by the longitudinal median of said body, said body being of compound curvature in lengthwise section at the longitudinal median thereof.

6. A fish-lure comprising a one-piece body formed with a frusto-elliptical shaped outer end part having a cavity of gradually increasing depth opening at one side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, said openings being intersected by the longitudinal median of said body, and said outer end part having a portion offset laterally with respect to said intermediate part on the other side of said body, the point of greatest depth of said body being rearwardly of the transverse median of said outer end part, said body being of compound curvature in lengthwise section at the longitudinal median thereof.

7. A fish-lure comprising a one-piece body formed with a frusto-elliptical shaped outer end part having a cavity of gradually increasing depth opening at the side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, and said openings being intersected by the longitudinal median of said body, that portion of the intermediate part bordering its point of mergence with said outer end part sloping towards and merging into the forward wall forming portion of said cavity.

8. A fish-lure comprising a one-piece body formed with a frusto-elliptical shaped outer end part having a cavity of gradually increasing depth opening at the side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, said openings being intersected by the longitudinal median of said body, that portion of the intermediate part bordering its point of mergence with said outer end part sloping towards and merging into the forward wall forming portion of said cavity, and said inner end part being inclined with respect to said intermediate part.

9. A fish-lure comprising a one-piece body formed with a frusto-elliptical shaped outer end part having a cavity of gradually increasing depth opening at the side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, said openings being intersected by the longitudinal median of said body, that portion of the intermediate part bordering its point of mergence with said outer end part sloping towards and merging into the rear wall forming portion of said cavity, said inner end part being inclined with respect to said intermediate part, and said outer end part being extended laterally with respect to said intermediate part on the other side of said body to form a bowl, the point of greatest depth of said body being rearwardly of the transverse median of said outer end part.

10. A fish-lure comprising a one-piece body formed with a frusto-elliptical shaped outer end part having a cavity of gradually increasing depth opening at the side of said body, a substantially semi-elliptical shaped inner end part and a semi-oval shaped intermediate part of greater length and width throughout than that of the said inner end part, said intermediate part merging into and forming a forward continuation of the outer part and a rearward continuation of said inner part, said outer end part being of greater length and width throughout than that of said intermediate part, said intermediate part gradually increasing in width from said inner end part to the said outer end part, said inner end part being formed with an opening in proximity to its edge, said outer end part being formed with an opening in proximity to its edge, said openings being intersected by the longitudinal median of said body, that portion of the intermediate part bordering its point of mergence with said outer end part sloping towards and merging into the forward wall forming portion of said cavity, said inner end part being inclined with respect to said intermediate part, and said outer end part being extended laterally with respect to said intermediate part on the other side of said body to form a bowl, the point of greatest depth of said body being rearwardly of the transverse median of said outer end part, said body being of compound curvature in lengthwise section at the longitudinal median thereof.

GUSTAV A. LAMBRECHT.